3,043,849
3-(3-SUBSTITUTED AMINO-1-PROPENYL)INDOLES
Jacob Szmuszkovicz, Portage Township, Kalamazoo County, Mich., assignor to The Upjohn Company, Kalamazoo, Mich., a corporation of Delaware
No Drawing. Filed Apr. 20, 1959, Ser. No. 807,269
6 Claims. (Cl. 260—319)

The present invention relates to a novel process for the preparation of 3-(3-amino-1-alkenyl)indoles and is more particularly concerned with novel 3-(3-amino-1-alkenyl)indoles and with addition compounds thereof such as acid addition salts, quaternary ammonium salts, N-oxides, and N-oxide acid addition salts, and with a process for their preparation. The present application is a continuation-in-part of application Serial No. 741,227, filed June 11, 1958, now abandoned.

The novel compounds of the invention are selected from the class consisting of (a) a compound having the general formula:

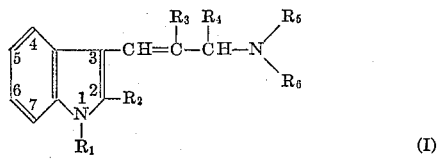

(I)

wherein $R_1$ represents a radical selected from the class consisting of hydrogen and lower-alkyl containing from one to six carbon atoms, inclusive, for example, methyl, ethyl, propyl, butyl, amyl, hexyl, and isomeric forms thereof; $R_2$ represents a radical selected from the class consisting of hydrogen, lower-alkyl containing from one to six carbon atoms, inclusive, for example, methyl, ethyl, propyl, butyl, amyl, hexyl, and isomeric forms thereof, lower-aralkyl containing from seven to thirteen carbon atoms, inclusive, for example, benzyl, phenethtyl, benzhydryl, and the like, and lower-aryl containing from six to ten carbon atoms, inclusive, for example, phenyl, tolyl, naphthyl, and the like; $R_3$ and $R_4$ each represent a radical selected from the class consisting of hydrogen and lower-alkyl containing from one to six carbon atoms, inclusive, for example, methyl, ethyl, propyl, butyl, amyl, hexyl, and isomeric forms thereof; $R_5$ and $R_6$ each represent a radical selected from the class consisting of lower-alkyl containing from one to six carbon atoms, inclusive, for example, methyl, ethyl, propyl, butyl, amyl, hexyl, and isomeric forms thereof, lower-aralkyl containing from seven to thirteen carbon atoms, inclusive, for example, benzyl, phenethyl, benzhydryl, and the like, and lower-aryl containing from six to ten carbon atoms, inclusive, for example, phenyl, tolyl, naphthyl, and the like, or $R_5$ and $R_6$ taken together with —N< represent a heterocyclic radical containing from five to seven ring atoms, one of which, in addition to the amino nitrogen atom, is selected from the class consisting of carbon, nitrogen, oxygen, and sulfur, the other ring atoms being carbon, for example, piperidino, morpholino, pyrrolidino, 2,2-dimethylpyrrolidino, thiamorpholino, hexamethyleneimino, piperazino, and the like; and the 4-, 5-, 6- and 7-positions in the benzene ring can include such substituents as hydrogen, hydroxy, halogen, for example, chlorine, bromine, and fluorine, a cyano radical, a lower-carbalkoxy radical, for example, carbomethoxy, carbethoxy, and the like, a di-lower-alkylamino radical, for example, dimethylamino, diethylamino, and the like, a lower-aralkoxy radical containing from seven to thirteen carbon atoms, inclusive, for example, benzyloxy, phenethoxy, benzhydryloxy, and the like, a lower-alkoxy radical containing from one to six carbon atoms, inclusive, for example, methoxy, ethoxy, propoxy, and the like, an acyloxy radical wherein the acyl substituent is derived from an organic carboxylic acid containing from one to eight carbon atoms, for example, acetoxy, propionoxy, capryloxy, and the like, a lower-alkyl radical containing from one to six carbon atoms, inclusive, for example, methyl, ethyl, propyl, butyl, amyl, hexyl, and isomeric forms thereof, a lower-aralkyl radical containing from seven to thirteen carbon atoms, inclusive, for example, benzyl, phenethyl, and the like, a lower-aryl radical containing from six to ten carbon atoms, inclusive, for example, phenyl, tolyl, naphthyl, and the like, a lower-aryloxy radical containing from six to ten carbon atoms, inclusive, for example, phenoxy, naphthoxy, and the like, and a lower-alkylcarbonato group, for example, ethylcarbonato, propylcarbonato, and the like, (b) the acid addition salts and quaternary ammonium salts thereof, and (c) the corresponding N-oxides and N-oxide acid addition salts. The term "N-oxide" as used herein refers to the nitrogen atom occurring in the side chain attached to the indole nucleus at position 3.

It is an object of the present invention to provide the novel compounds of the above formula. It is a further object of the invention to provide a novel process for the preparation of the compounds of the above formula. Other objects of the invention will be apparent to those skilled in the art to which this invention pertains.

The novel process of the invention comprises reacting a compound having the general formula:

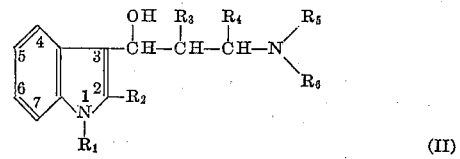

(II)

wherein $R_1$, $R_2$, $R_3$, $R_4$, $R_5$ and $R_6$ have the significance hereinbefore defined, and the 4-, 5-, 6-, and 7-positions in the benzene ring can be substituted as hereinbefore defined with an alkyl chloroformate of the formula Cl·COOR wherein R represents an alkyl group containing from one to six carbon atoms such as methyl, ethyl, propyl, butyl, amyl, hexyl, and isomeric forms thereof, in the presence of a tertiary amine. The tertiary amines which can be employed in the process include pyridine, the picolines, trialkylamines such as trimethylamine, triethylamine, and the like, N,N-dialkylanilines such as dimethylaniline, diethylaniline, and the like, quinoline, isoquinoline, and N-alkylpiperidines such as N-methylpiperidine, N-ethylpiperidine, and the like. The preferred tertiary amine is pyridine.

The initial stage of the reaction is believed to involve the formation of the intermediate alkylcarbonato derivative of the alcohol of the above Formula II. This stage is exothermic and is preferably conducted by adding the alkyl chloroformate to a mixture of the alcohol and tertiary amine with external cooling to maintain the reaction temperature below about twenty degrees centigrade and preferably at about zero degree centigrade. The intermediate carbonate so formed decomposes spontaneously. The decomposition is facilitated by allowing the reaction mixture to remain at a temperature within the range of about zero degree centigrade to about thirty degrees centigrade, the preferred range being about fifteen degrees centigrade to about 25 degrees centigrade, for a period of from about ten hours to about thirty hours. The desired compound (Formula I) can then be isolated from the reaction mixture advantageously by adding water, preferably in the form of ice, basifying the resulting mixture, and extracting the liberated amine in a water-immiscible solvent such as ether, or by other conventional procedures.

The tertiary amines which are employed as reactants in the process of this invention, described above, also serve as solvents for the reaction mixture and it is therefore unnecessary, though not necessarily undesirable, to employ additional reaction solvents.

Where the compounds of Formula II above contain one or more free hydroxy radicals in the 4-, 5-, 6-, or 7-position, such hydroxy radicals will be converted to lower-alkylcarbonato radicals by the process of the invention. If desired, such alkylcarbonato radicals can be reconverted to free hydroxy radicals by hydrolysis, for example, using dilute mineral acid or dilute alkali, after the process of the invention has been completed. Similarly, where the compounds of Formula I, produced by the process of the invention, carry lower-acyloxy radicals as hereinbefore defined, as a substituent or substituents in the 4-, 5-, 6-, or 7-positions, such radicals can be converted by conventional procedures to free hydroxy radicals. Thus the compounds containing a lower-acyloxy radical or radicals can be subjected to hydrolysis, for example, using dilute mineral acid or dilute alkali, to yield the corresponding compounds having a free hydroxy radical or radicals.

The 3-(3-amino-1-hydroxyalkyl)indoles of Formula II, which are employed as starting materials in the process of the invention, can be prepared by methods which are well-known in the art.

Thus the compounds of Formula II in which $R_1$, $R_2$, $R_3$, $R_4$, $R_5$, and $R_6$ have the significance hereinbefore defined can be prepared by reduction of the corresponding ketones having the general formula:

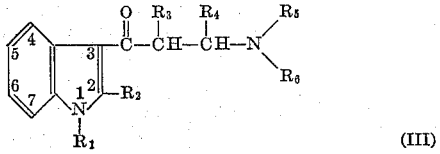

(III)

wherein $R_1$, $R_2$, $R_3$, $R_4$, $R_5$, and $R_6$ have the significance hereinbefore defined and the 4-, 5-, 6-, and 7-positions in the benzene ring can be substituted as hereinbefore defined. The reduction of these ketones can be effected using methods well-known in the art for the reduction of ketones to secondary alcohols. The preferred reducing agent is sodium borohydride. Such a procedure is described in U.S. Patent 2,821,532 for the preparation of compounds having the Formula II wherein $R_1$ represents a hydrogen atom only and $R_2$, $R_3$, $R_4$, $R_5$, and $R_6$ have the significance hereinbefore defined.

The ketones having the Formula III can be prepared by reacting a 3-acylindole having the general formula:

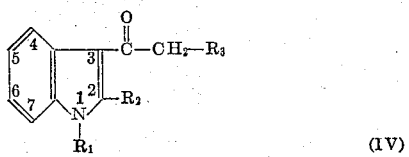

(IV)

wherein $R_1$, $R_2$, and $R_3$ have the significance hereinbefore defined and the 4-, 5-, 6-, and 7-positions in the benzene ring can be substituted as hereinbefore defined, with an aldehyde $R_4 \cdot CHO$, wherein $R_4$ has the significance hereinbefore defined, and an amine

wherein $R_5$ and $R_6$ have the significance hereinbefore defined, in the presence of an inert solvent. The reaction is generally carried out under acid conditions, i.e., a pH of less than seven. Such acid conditions can be brought about conveniently by employing the amine

in the form of an acid addition salt such as the hydrochloride, sulfate, hydrobromide, and the like. The acid conditions can also be brought about by the addition of an acid such as acetic, hydrochloric, phosphoric, sulfuric, hydrobromic, and the like, to the reaction mixture.

The reaction is carried out at a temperature between about fifty degrees centigrade and about 100 degrees centigrade advantageously at a temperature between about 65 degrees centigrade and about 85 degrees centigrade. The reaction is generally completed after a period of about 24 hours.

When $R_1$ in the starting 3-acylindole having the Formula IV above represents a hydrogen atom, the use of approximately equimolar quantities of the reactants in the above-described reaction will furnish the desired compound of Formula III in which the group $R_1$ is hydrogen. However, if the reaction is carried out using at least approximately two molar proportions of aldehyde and amine per mole of compound of Formula IV, the hydrogen atom represented by $R_1$ in the latter compound will be replaced by the group

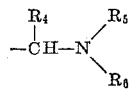

where $R_4$, $R_5$, and $R_6$ have the significance hereinbefore defined. The product so obtained can be converted to the desired compound having the Formula III, wherein $R_1$ represents a hydrogen atom, by alkaline hydrolysis using, for example, potassium hydroxide, sodium hydroxide, sodium carbonate, potassium carbonate, and the like.

The 3-acylindoles having the Formula IV which are employed as starting materials in the preparation of the compounds having the Formula III can be prepared by processes outlined in "Heterocyclic Compounds," Elderfield, volume 3, page 44, 1952, John Wiley and Sons, Inc. For example, 3-indolyl methyl ketone can be prepared by reacting acetyl chloride with 3-indolylmagnesium iodide; 3-(2-methylindolyl)methyl ketone can be prepared by reacting 2-methylindole with acetic anhydride and sodium acetate.

The acid addition salts of the invention can be prepared by reacting a compound of Formula I above with a pharmacologically acceptable acid in the presence of an inert solvent such as water, ether, and lower alkanols such as methanol, ethanol, and the like. The acids which can be employed in the preparation of such salts include sulfuric, hydrochloric, hydrobromic, nitric, phosphoric, acetic, lactic, citric, tartaric, benzoic, and p-toluenesulfonic acids, and the like. The quaternary ammonium salts of the invention can be prepared by reacting, preferably in the presence of an inert solvent such as acetone, methanol, and the like, the tertiary amines of Formula I, in the form of the free base, with an alkyl halide such as methyl iodide, ethyl iodide, and the like, allyl chloride, a dialkyl sulfate such as dimethyl sulfate, and the like, an aralkyl halide such as benzyl chloride, and the like, or an alkyl arylsulfonate such as methyl p-toluenesulfonate, and the like.

The compounds of Formula I above can be converted to the corresponding N-oxides by reacting the tertiary amine free base with not more than a stoichiometric amount of an oxidizing agent such as hydrogen peroxide, peracetic acid, and the like. The N-oxides so prepared can be converted to acid addition salts by reacting them with a pharmacologically acceptable acid in the presence of an inert solvent such as water, a lower alkanol such as methanol, and the like. The acids which can be employed for the preparation of such salts include sulfuric, hydrochloric, hydrobromic, nitric, phosphoric, acetic, lactic, citric, tartaric, benzoic, and p-toluenesulfonic acids, and the like.

The novel compounds of the invention have hypotensive activity. Certain of the compounds also possess additional pharmacodynamic activity. Thus 3-(3-dimethylamino-1-propenyl)indole exhibits antihistaminic activity and such activity has not previously been reported in the indole series. In addition the compounds of the present invention can be reduced, for example, by catalytic hydrogenation, to the pharmacologically active 3-(3-tertiaryaminopropyl)indoles. Furthermore the compounds of the invention can be reacted with fluosilicic acid to form the fluosilicate salts which in dilute aqueous solutions are effective mothproofing agents as more fully disclosed in U.S. Patents 2,075,359 and 1,915,334.

The following examples are illustrative of the process and products of the present invention but are not to be construed as limiting.

EXAMPLE 1

3-(3-Dimethylamino-1-Propenyl)Indole

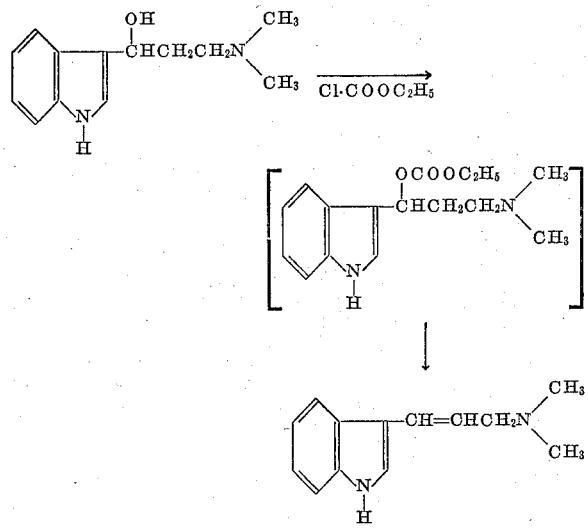

A solution of 29 grams (0.133 mole) of 3-(3-dimethylamino-1-hydroxypropyl)indole (U.S. Patent 2,821,532) in 530 milliliters of anhydrous pyridine was stirred gently and cooled in ice water while 120 milliliters (1.25 moles) of freshly distilled ethyl chloroformate was added as quickly as possible. After the addition was complete the solid reaction mixture was allowed to stand for two hours with cooling in ice water and was then allowed to stand for 21 hours at room temperature. The product so obtained, in the form of two liquid layers, was cooled in ice water and approximately 200 grams of ice followed by 500 milliliters of water was added carefully. The mixture was extracted with two portions, each of 500 milliliters, of ether and the ethereal extracts were discarded. The aqueous solution was cooled in ice and treated with a solution of 160 milliliters of 29 percent aqueous ammonia solution in 300 milliliters of water. The mixture was extracted with four portions, each of 400 milliliters, of ether. The combined ethereal extracts were washed with 200 milliliters of water, then with two portions, each of 300 milliliters, of saturated sodium chloride solution, and dried over anhydrous sodium sulfate. The dry ether solution was then evaporated, the residual oil was dissolved in thirty milliliters of benzene, and forty milliliters of petroleum ether (boiling range thirty to sixty degrees centigrade) was added. The solution was allowed to stand overnight at zero degree centigrade and the crystalline solid which had separated was isolated, washed with petroleum ether (boiling range thirty to sixty degrees centigrade) containing five percent of benzene, then with petroleum ether (boiling range thirty to sixty degrees centigrade) containing twenty percent of anhydrous ether, and recrystallized twice from a mixture of benzene and petroleum ether (boiling range thirty to sixty degrees centigrade). There was thus obtained 3-(3-dimethylamino-1-propenyl)indole in the form of a crystalline solid having a melting point of 108 to 112 degrees centigrade, the ultraviolet absorption spectrum of which showed maxima at 227 mu, 261.5 mu, and 284.5 mu.

Analysis.—Calcd. for $C_{13}H_{16}N_2$: C, 77.96; H, 8.05; N, 13.99. Found: C, 78,40; H, 7.62; N, 13.87.

EXAMPLE 2

1-Methyl-3-(3-Dimethylamino-1-Propenyl)Indole and the Hydrochloride Thereof

A. Preparation of 1-methyl-3-(3-dimethylaminopropionyl)indole.—A mixture of 13.6 grams (0.0785 mole) of 1-methyl-3-acetylindole, 6.4 grams (0.0785 mole) of dimethylamine hydrochloride, 3.54 grams (0.118 mole) of para-formaldehyde and fifty milliliters of absolute ethanol was heated under reflux for 27 hours. The solution was evaporated under reduced pressure and the resulting solid residue was recrystallized twice from a mixture of methanol and ether. There was thus obtained 11.4 grams (second crop; 0.55 gram) of 1-methyl-3-(3-dimethylaminopropionyl)indole hydrochloride in the form of a crystalline solid having a melting point of 186 to 187 degrees centigrade.

Analysis.—Calcd. for $C_{14}H_{18}N_2O \cdot HCl$: C, 63.03; H, 7.35; Cl, 13.29; N, 10.50. Found: C, 62.81; H, 6.93; Cl, 13.33; N, 9.96.

B. Preparation of 1-methyl-3-(3-dimethylamino-1-hydroxypropyl)indole.—A portion of the 1-methyl-3-(3-dimethylaminopropionyl)indole hydrochloride so prepared was dissolved in water. The solution was treated with a slight excess of potassium hydroxide and the liberated oil was extracted in ether. The ethereal extract was washed with water, then with saturated sodium chloride solution, dried over anhydrous sodium sulfate, and evaporated to dryness. 3.3 grams (0.012 mole) of the residual oil was dissolved in fifteen milliliters of methanol and added to an ice-cold solution of 3.5 grams (0.092 mole) of sodium borohydride in twenty milliliters of methanol. The mixture was cooled in ice and stirred for fifteen minutes, then stirred for a further nineteen hours at room temperature (approximately twenty degrees centigrade). The resulting mixture was cooled in ice, diluted with 100 milliliters of water and extracted with three portions, each of 100 milliliters, of ether. The combined ethereal extracts were washed with water and with saturated sodium chloride solution, dried over anhydrous sodium sulfate, and evaporated to dryness. The oily residue was dissolved in a mixture of 75 milliliters of methanol, ten grams of potassium hydroxide and 25 milliliters of water and the solution was heated under reflux for two hours. The solution was evaporated to dryness under reduced pressure and the resulting residue was extracted with three portions, each of 100 milliliters, of ether. The combined ethereal extracts were washed twice with saturated sodium chloride solution, dried over anhydrous sodium sulfate, and evaporated to dryness. The crystalline residue was recrystallized from a mixture of ether and petroleum ether (boiling range thirty to sixty degrees centigrade). There was thus obtained 1-methyl-3-(3-dimethylamino-1-hydroxypropyl)indole in the form of a crystalline solid which had a melting point of 87.5 to 88.5 degrees centigrade.

Analysis.—Calcd. for $C_{14}H_{20}N_2O$: C, 72.37; H, 8.68; N, 12.06. Found: C, 72.76; H, 8.64; N, 12.18.

C. Preparation of 1-methyl-3-(3-dimethylamino-1-propenyl)indole and the hydrochloride thereof.—Using the procedure described in Example 1, but substituting 1-methyl-3-(3-dimethylamino-1-hydroxypropyl)indole for 3-(3-dimethylamino-1-hydroxypropyl)indole, there was obtained 1-methyl-3-(3-dimethylamino-1-propenyl)indole in the form of an oil which did not crystallize, the ultraviolet absorption spectrum of which showed maxima at 229 mu, 263 mu, 288 mu and 305 mu.

Analysis.—Calcd. for $C_{14}H_{18}N_2$: N, 13.07. Found: N, 12.73.

A mixture of 0.0715 gram of 1-methyl-3-(3-dimethylamino-1-propenyl)indole, 0.09 gram of trinitrofluorenone and ten milliliters of ethanol was heated under reflux for five minutes. The resulting mixture was filtered hot; the filtrate was concentrated to about five milliliters and allowed to crystallize. There was thus obtained the trinitrofluorenone derivative of 1-methyl-3-(3-dimethylamino-1-propenyl)indole in the form of a crystalline solid which had a melting point of 97 to 99 degrees centigrade.

Analysis.—Calcd. for $C_{27}H_{23}N_5O_7$: C, 61.24; H, 4.38; N, 13.23. Found: C, 61.27; H, 4.72; N, 13.11.

A solution of two grams (0.0094 mole) of 1-methyl-3-(3-dimethylamino-1-propenyl)indole in fifty milliliters of anhydrous ether was cooled in ice and an equivalent amount of a solution of hydrogen chloride in either was added. The solid which separated was isolated, washed with ether and dried. There was thus obtained 1-methyl-3-(3-dimethylamino-1-propenyl)indole hydrochloride.

EXAMPLE 3
*2-p-Chlorophenyl-3-(3-Ethylmethylamino-1-Propenyl)Indole*

Using the procedure described in Example 1 but substituting 2-p-chlorophenyl-3-(3-ethylmethylamino-1-hydroxypropyl)indole (U.S. Patent 2,821,532) for 3-(3-dimethylamino-1-hydroxypropyl)indole, there was obtained 2-p-chloro-phenyl-3-(3-ethylmethylamino-1-propenyl)indole.

EXAMPLE 4
*2-Benzyl-3-(2-Ethyl-3-Dibenzylamino-1-Propenyl)Indole*

Using the procedure described in Example 1, but substituting 2-benzyl-3-(2-ethyl-3-dibenzylamino-1-hydroxypropyl)indole (U.S. Patent 2,821,532) for 3-(3-dimethylamino-1-hydroxypropyl)indole, there was obtained 2-benzyl-3-(2-ethyl-3-dibenzylamino-1-propenyl)indole.

EXAMPLE 5
*2,5-Diphenyl-3-(3-Diphenylamino-1-Propenyl)Indole*

Using the procedure described in Example 1, but substituting 2,5-diphenyl-3-(3-diphenylamino-1-hydroxypropyl)indole (U.S. Patent 2,821,532) for 3-(3-dimethylamino-1-hydroxypropyl)indole, there was obtained 2,5-diphenyl-3-(3-diphenylamino-1-propenyl)indole.

EXAMPLE 6
*4-Cyano-3-(3-Dipropylamino-1-Propenyl)Indole*

Using the procedure described in Example 1, but substituting 4-cyano-3-(3-dipropylamino-1-hydroxypropyl)indole (U.S. Patent 2,821,532) for 3-(3-dimethylamino-1-hydroxypropyl)indole, there was obtained 4-cyano-3-(3-dipropylamino-1-propenyl)indole.

EXAMPLE 7
*3-(3-Dibenzylamino-1-Propenyl)Indole*

2-dibenzylaminoethyl 3-indolyl ketone, prepared from 3-acetylindole, dibenzylamine and paraformaldehyde using the procedure described in Example 2A, was reduced using sodium borohydride according to the procedure described in Example 2B to obtain 3-(3-dibenzylamino-1-hydroxypropyl)indole. The latter compound was reacted with ethyl chloroformate in the presence of pyridine according to the procedure described in Example 1 to obtain 3-(3-dibenzylamino-1-propenyl)indole.

EXAMPLE 8
*5-Benzyloxy-3-(3-Dimethylamino-1-Propenyl)Indole*

Using the procedure described in Example 7, but substituting 2-dimethylaminoethyl 3-(5-benzyloxy)indolyl ketone for 2-dibenzylaminoethyl 3-indolyl ketone, there was obtained 5-benzyloxy-3-(3-dimethylamino-1-propenyl)indole.

EXAMPLE 9
*3-(3-Dimethylamino-2-Methyl-1-Propenyl)Indole*

Using the procedure described in Example 7, but substituting 1-methyl-2-dimethylaminoethyl 3-indolyl ketone for 2-dibenzylaminoethyl 3-indolyl ketone, there was obtained 3-(3-dimethylamino-2-methyl-1-propenyl)indole.

EXAMPLE 10
*3-(3-Diethylamino-2-Ethyl-1-Propenyl)Indole*

Using the procedure described in Example 7, but substituting 1-ethyl-2-diethylaminoethyl 3-indolyl ketone for 2-dibenzylaminoethyl 3-indolyl ketone, there was obtained 3-(3-diethylamino-2-ethyl-1-propenyl)indole.

EXAMPLE 11
*4-Methyl-3-(3-Methylbenzylamino-1-Propenyl)Indole*

Using the procedure described in Example 7, but substituting 2-methylbenzylaminoethyl 3-(4-methylindolyl) ketone for 2-dibenzylaminoethyl 3-indolyl ketone, there was obtained 4-methyl-3-(3-methylbenzylamino-1-propenyl)indole.

EXAMPLE 12
*2-Ethyl-5-Ethoxy-3-(3-Methyl-3-Morpholino-1-Propenyl)Indole*

Using the procedure described in Example 7, but substituting 2-methyl-2-morpholinoethyl 3-(2-ethyl-5-ethoxyindolyl) ketone for 2-dibenzylaminoethyl 3-indolyl ketone, there was obtained 2-ethyl-5-ethoxy-3-(3-methyl-3-morpholino-1-propenyl)indole.

EXAMPLE 13
*5,6-Diethoxy-3-(3-Dipropylamino-1-Propenyl)Indole*

Using the procedure described in Example 7, but substituting 2-dipropylaminoethyl 3-(5,6-diethoxyindolyl) ketone for 2-dibenzylaminoethyl 3-indolyl ketone, there was obtained 5,6-diethoxy-3-(3-dipropylamino-1-propenyl)indole.

EXAMPLE 14
*4-Dimethylamino-3-(3-Pyrrolidino-1-Propenyl)Indole*

Using the procedure described in Example 7, but substituting 2-pyrrolidinoethyl 3(4-dimethylaminoindolyl) ketone for 2-dibenzylaminoethyl 3-indolyl ketone, there was obtained 4-dimethylamino-3-(3-pyrrolidino-1-propenyl)indole.

EXAMPLE 15
*1-Propyl-5-Carbethoxy-3-(3-Ethylbenzylamino-1-Propenyl)Indole*

Using the procedure described in Example 7, but substituting 2-ethylbenzylaminoethyl 3-(1-propyl-5-carbethoxyindolyl) ketone for 2-dibenzylaminoethyl 3-indolyl ketone, there was obtained 1-propyl-5-carbethoxy-3-(3-ethylbenzylamino-1-propenyl)indole.

EXAMPLE 16
*2,6-Dibenzyl-3-(3-Piperidino-1-Propenyl)Indole*

Using the procedure described in Example 7, but substituting 2-piperidinoethyl 3-(2,6-dibenzylindolyl) ketone for 2-dibenzylaminoethyl 3-indolyl ketone, there was obtained 2,6-dibenzyl-3-(3-piperidino-1-propenyl)indole.

EXAMPLE 17
*3-(3-Dimethylamino-1-Propenyl)Indole Methiodide*

A solution of two grams (0.01 mole) of 3-(3-dimethylamino-1-propenyl)indole (prepared as disclosed in Example 1) in ten milliliters of methanol was cooled in ice and treated with 2.84 grams (0.02 mole) of methyl iodide. The mixture was allowed to stand at approximately zero degrees centigrade for four hours and the solid which separated was collected, washed with cold methanol and dried. There was thus obtained 3-(3-dimethylamino-1-propenyl)indole methiodide.

EXAMPLE 18

3-(3-Dimethylamino-1-Propenyl)Indole N-Oxide and the Hydrochloride Thereof

A mixture of 2.6 grams (0.013 mole) of 3-(3-dimethylamino-1-propenyl)indole (prepared as disclosed in Example 1), fifty milliliters of absolute ethanol and 1.6 milliliters (0.013 mole) of 29 percent hydrogen peroxide was allowed to stand for four days at a temperature of approximately twenty degrees centigrade. The resulting solution was shaken with an aqueous slurry of palladium-on-charcoal for two hours to decompose any excess hydrogen peroxide. The palladium-on-charcoal was removed by filtration and the filtrate was evaporated to dryness under reduced pressure. The residue was crystallized from ethyl acetate. There was thus obtained 3-(3-dimethylamino-1-propenyl) indole N-oxide. A portion of the latter compound was dissolved in water and an equivalent amount of hydrochloric acid was added to the solution. There was thus obtained an aqueous solution of 3-(3-dimethylamino-1-propenyl)indole N-oxide hydrochloride.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A process for the preparation of a compound having the formula:

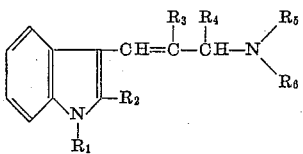

wherein $R_1$ represents a radical selected from the class consisting of hydrogen and alkyl from 1 to 6 carbon atoms, inclusive, $R_2$ represents a radical selected from the class consisting of hydrogen, alkyl from 1 to 6 carbon atoms, inclusive, aralkyl from 7 to 13 carbon atoms, inclusive, and aryl from 6 to 10 carbon atoms, inclusive; $R_3$ and $R_4$ each represent a radical selected from the class consisting of hydrogen and alkyl from 1 to 6 carbon atoms, inclusive; $R_5$ and $R_6$ each represent a radical selected from the class consisting of alkyl from 1 to 6 carbon atoms, inclusive, aralkyl from 7 to 13 carbon atoms, inclusive, and aryl from 6 to 10 carbon atoms, inclusive, and $R_5$ and $R_6$ taken with the attached nitrogen atom represent the heterocyclic radical selected from the class consisting of piperidino, morpholino, pyrrolidino, 2,2-dimethylpyrrolidino, thiamorpholino, hexamethyleneimino, and piperazino, which comprises reacting a compound having the general formula:

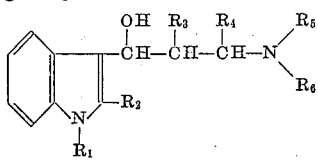

wherein $R_1$, $R_2$, $R_3$, $R_4$, $R_5$, and $R_6$ have the significance hereinbefore defined with a chloroformate having the formula Cl·COOR, wherein R represents an alkyl radical from 1 to 6 carbon atoms, inclusive, in the presence of a tertiary amine at a temperature of from about zero degrees centigrade to about thirty degrees centigrade.

2. A process for the preparation of 3-(3-dimethylamino-1-propenyl)indole, which comprises reacting 3-(3-dimethylamino-1-hydroxypropyl)indole with ethyl chloroformate in the presence of pyridine at a temperature of about zero degrees centigrade to about thirty degrees centigrade.

3. A process for the preparation of 1-methyl-3-(3-dimethylamino-1-propenyl)indole, which comprises reacting 1-methyl-3-(3 - dimethylamino - 1 - hydroxypropyl)indole with ethyl chloroformate in the presence of pyridine at a temperature of about zero degrees centigrade to about thirty degrees centigrade.

4. A compound selected from the class consisting of (a) a compound having the formula:

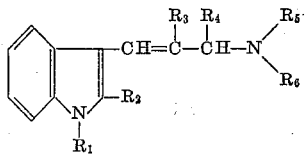

wherein $R_1$ represents a radical selected from the class consisting of hydrogen and alkyl from 1 to 6 carbon atoms, inclusive, $R_2$ represents a radical selected from the class consisting of hydrogen, alkyl from 1 to 6 carbon atoms, inclusive, aralkyl from 7 to 13 carbon atoms, inclusive, and aryl from 6 to 10 carbon atoms, inclusive; $R_3$ and $R_4$ each represent a radical selected from the class consisting of hydrogen and alkyl from 1 to 6 carbon atoms, inclusive; $R_5$ and $R_6$ each represent a radical selected from the class consisting of alkyl from 1 to 6 carbon atoms, inclusive, aralkyl from 7 to 13 carbon atoms, inclusive, and aryl from 6 to 10 carbon atoms, inclusive, and $R_5$ and $R_6$ taken with the attached nitrogen atom represent the heterocyclic radical selected from the class consisting of piperidino, morpholino, pyrrolidino, 2,2-dimethylpyrrolidino, thiamorpholino, hexamethyleneimino, and piperazino, (b) the pharmacologically acceptable acid addition salts thereof, (c) quaternary ammonium salts thereof, (d) the corresponding N-oxides, and (e) the corresponding N-oxide pharmacologically acceptable acid addition salts.

5. 3-(3-dimethylamino-1-propenyl)indole.
6. 1-methyl-3-(3-dimethylamino-1-propenyl)indole.

References Cited in the file of this patent

UNITED STATES PATENTS

| | | |
|---|---|---|
| 2,751,393 | Schindler et al. | June 19, 1956 |
| 2,821,532 | Anthony et al. | Jan. 28, 1958 |
| 2,877,234 | Szmuszkovicz | Mar. 10, 1959 |

OTHER REFERENCES

Majima et al.: Berichte Deutsche Chemische Gesellschaft, vol. 58, pages 2045 to 2046 (1925).

Wieland et al.: Annalen der Chemie, vol. 528, pages 234 to 246 (1937).

Bergmann: The Chemistry of Acetylene and Related Compounds, page 80, Interscience Publishers Inc., N.Y. (1948).

Beilstein's Handbuch der Organischen Chemie, 4th edition, vol. 22, p. 349, system No. 3395 (Zweites Erganzungs-werk 1953).

Smith: Journ. of the Chem. Soc., 1954, pages 3842 to 3845.

Theiheimer: "Synthetic Methods of Organic Chemistry," vol. 8, page 367 (No. 915), S. Karger, New York (1954).

Fish et al.: Journal of the American Chemical Society, vol. 77, pp. 5892–5 (1955).

Szmuszkovicz: Journ. of the Am. Chem. Soc., vol. 82, pages 1180–6 (1960).